(No Model.)

C. POWELL.
ATTACHMENT FOR CONNECTING HOSE TO PUMP SPOUTS.

No. 260,122. Patented June 27, 1882.

Witnesses.
Lewis Tomlinson
C. W. Baldwin

Inventor.
Charles Powell
by Ridout, Aird & Co.
Attorneys

UNITED STATES PATENT OFFICE.

CHARLES POWELL, OF TORONTO, ONTARIO, CANADA.

ATTACHMENT FOR CONNECTING HOSE TO PUMP-SPOUTS.

SPECIFICATION forming part of Letters Patent No. 260,122, dated June 27, 1882.

Application filed January 26, 1882. (No model.)

*To all whom it may concern:*

Be it known that I, CHARLES POWELL, of the city of Toronto, in the county of York, in the Province of Ontario, Canada, have invented a certain new and useful Attachment for Connecting Hose to the Spout of a Pump, of which the following is a specification.

The object of the invention is to produce a simple attachment for connecting hose to the spout of a pump; and it consists in the construction, operation, and combination of parts, as more fully hereinafter described and claimed.

Figure 1:
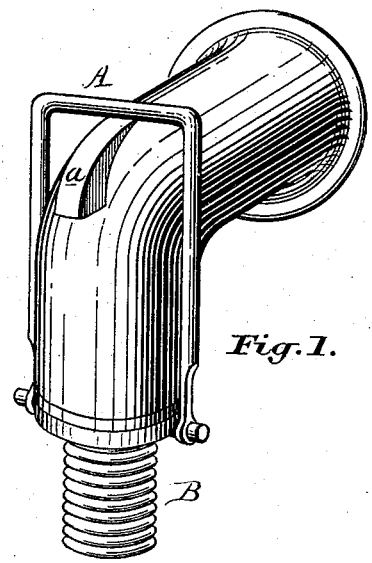
Figure 2:
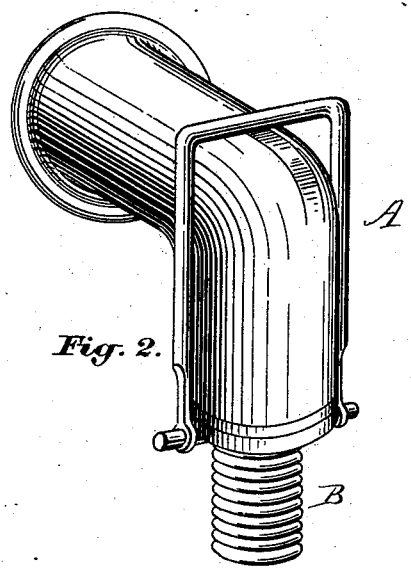
Figure 3:
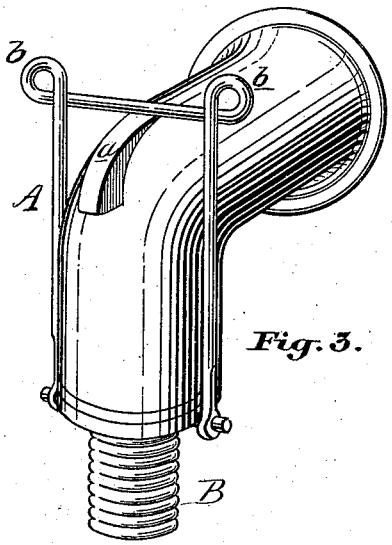
Figure 4:
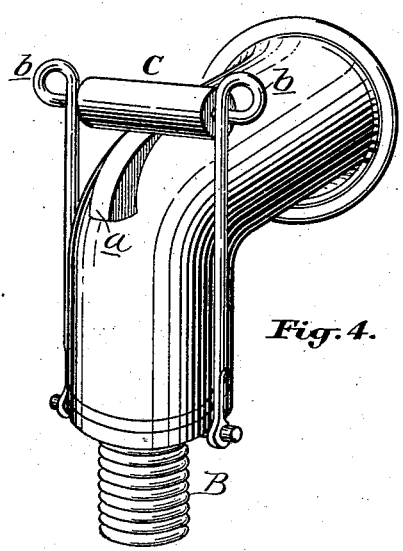

Figure 1 is a perspective view of a spout having a horn cast on its top to receive the bail, which is pivoted to a coupling, also shown. Fig. 2 is a perspective view of a spout with its top surface properly curved to answer the same purpose as the horn. Fig. 3 is a perspective view of a spout and hose coupling connected by a bail having curled or twisted corners. Fig. 4 is a perspective view of a spout and coupling connected by a bail having curled corners and a roller placed upon the bail between the said corners.

In Fig. 1, A represents an ordinary straight bail pivoted to the hose-coupling B, and made such a length that when slipped over the horn $a$, formed on the top of the spout A, it will, when set at right angles, or nearly so, to the face of the coupling, compress the said coupling against the mouth of the spout sufficiently hard to form a water-tight joint. A washer or gasket may of course be placed in the joint.

Instead of the horn, the spout may have a curved top surface, as shown in Fig. 2, in which case the bail may be pressed up upon its top surface, in the same manner as though it were being pressed upon the horn, producing a like effect.

In order that the bail may spring in position more freely, I sometimes form it in the shape shown in Figs. 3 and 4. In the former figure it is shown simply with curled corners $b$, which will cause the center of the bail to spring, and thereby adjust itself to any slight inequality in the top surface of the pump-spout. In order to further facilitate the slipping of the bail into position, I add a roller, C, (shown in Fig. 4,) between the curled corners $b$.

What I claim as my invention is—

1. The combination, with a hose-coupling, of a bail pivoted thereto, and a discharge-spout having a curved or inclined surface adapted to tightly draw the bail upward when said bail is pressed over the spout, substantially as and for the purpose specified.

2. In combination with a discharge-spout having an outwardly-inclined top surface, a bail pivoted to a coupling arranged to fit the mouth of the spout, the corner of the said bail being twisted or curled to permit the bail to spring while being pressed upon the spout, as and for the purpose herein specified.

3. In combination with a discharge-spout having an outwardly-inclined top surface, a bail with twisted or curled corners, and a roller placed on the bail between them, the ends of the bail being pivoted to a coupling arranged to fit the mouth of the spout.

CHARLES POWELL.

Witnesses:
C. W. BALDWIN,
H. H. WARREN.